Figure 10:
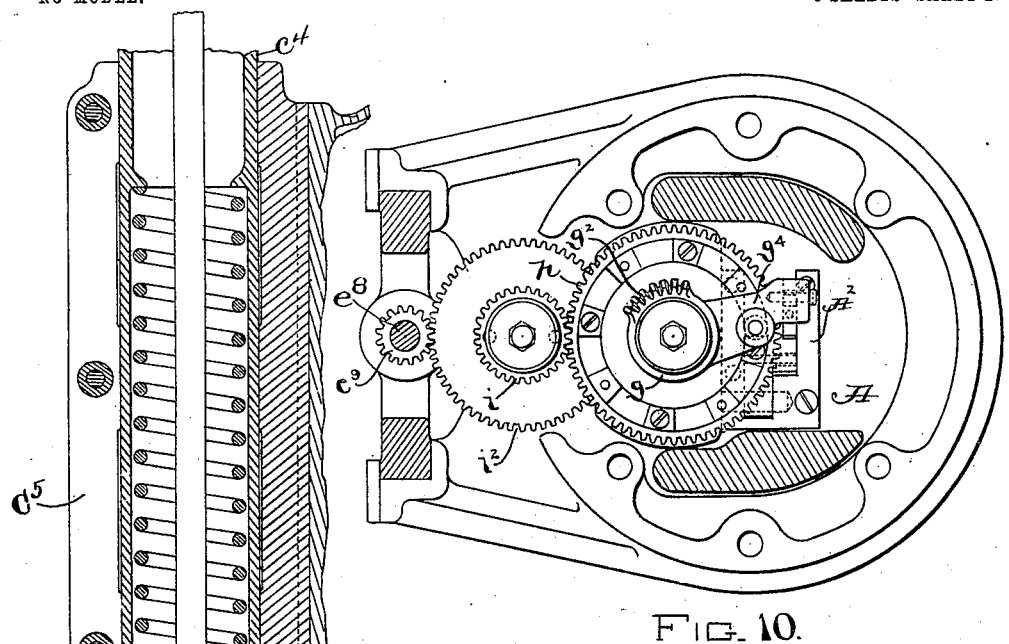

No. 763,466. PATENTED JUNE 28, 1904.
J. F. DAVEY.
PEGGING MACHINE.
APPLICATION FILED JULY 16, 1900.
NO MODEL. 5 SHEETS—SHEET 1.
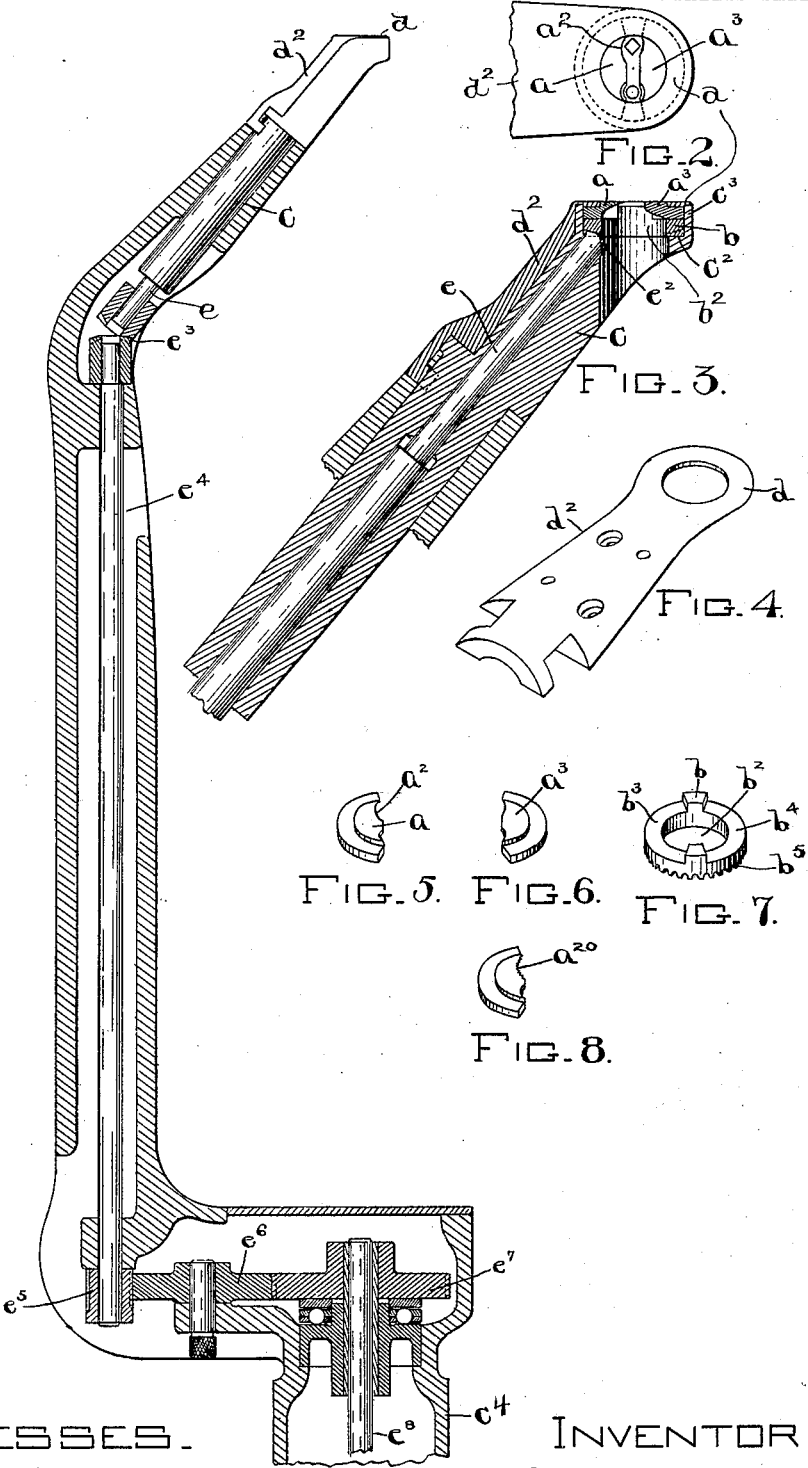
WITNESSES.
Jas. F. Maloney.
Nancy P. Ford.
INVENTOR.
John F. Davey.
by J. P. and H. P. Livermore
attys.

No. 763,466. PATENTED JUNE 28, 1904.
J. F. DAVEY.
PEGGING MACHINE.
APPLICATION FILED JULY 16, 1900.
NO MODEL. 5 SHEETS—SHEET 2.

WITNESSES. INVENTOR

No. 763,466. PATENTED JUNE 28, 1904.
J. F. DAVEY.
PEGGING MACHINE.
APPLICATION FILED JULY 16, 1900.
NO MODEL. 5 SHEETS—SHEET 3.

WITNESSES.
Jas. J. Maloney
Nancy P. Ford

INVENTOR.
John F. Davey
by J. P. and J. J. Livermore
Attys.

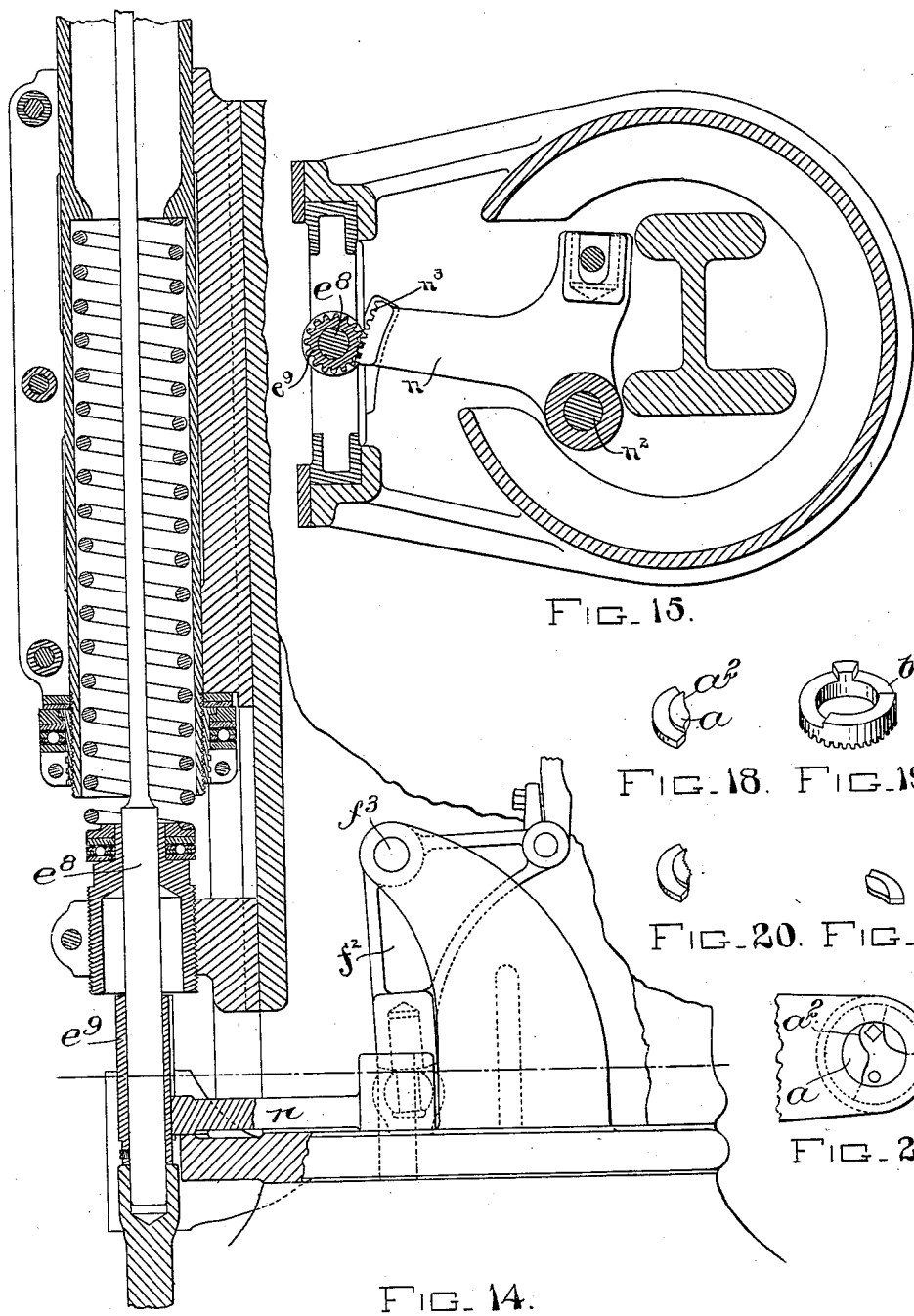

No. 763,466. PATENTED JUNE 28, 1904.
J. F. DAVEY.
PEGGING MACHINE.
APPLICATION FILED JULY 16, 1900.
NO MODEL. 5 SHEETS—SHEET 5.

WITNESSES. INVENTOR.
John F. Davey.

No. 763,466. Patented June 28, 1904.

UNITED STATES PATENT OFFICE.

JOHN F. DAVEY, OF BEVERLY, MASSACHUSETTS, ASSIGNOR TO THE UNITED SHOE MACHINERY COMPANY, OF PATERSON, NEW JERSEY, AND BOSTON, MASSACHUSETTS, A CORPORATION OF NEW JERSEY.

PEGGING-MACHINE.

SPECIFICATION forming part of Letters Patent No. 763,466, dated June 28, 1904.

Application filed July 16, 1900. Serial No. 23,756. (No model.)

*To all whom it may concern:*

Be it known that I, JOHN F. DAVEY, of Beverly, county of Essex, and State of Massachusetts, have invented an Improvement in Pegging-Machines, of which the following description, in connection with the accompanying drawings, is a specification, like letters on the drawings representing like parts.

The present invention relates to a pegging-machine, and is mainly embodied in an improved peg cutting or trimming device and the operating mechanism therefor, the object being to obtain an effective trimmer operating close to the surface of the work-support and so arranged that the cutting portion is entirely out of the path of movement of the awl in the feeding operation. In machines of this class the horn is commonly bent or offset, so as to enter the toe portion of the shoe, and is arranged to be rotated at the will of the operator without interfering with the working of the machine as the shoe is pegged, so that the operator can hold the shoe in such a manner that the horn will be close to the edge of the sole as the shoe is fed along. To have the pegs driven close to the edge of the sole, it is necessary that the support and connecting mechanism should be as small as possible, while in order to give an adequate support for the material it is desirable that only such space should be left in the support as is necessary for the feed movement of the awl, which projects below the support during such movement. This is accomplished in accordance with the present invention by providing the machine with a support the diameter of which is only slightly greater than the feed movement of the awl and causing the said awl to travel diametrically from one side to the other of said support in the operation of the machine. To accomplish this, the cutting device itself is utilized as a portion of the support and includes not only a cutting member which in itself forms a partial support for the material, but a supplemental supporting portion, between which portions there is a channel extending diametrically across the support, the said cutting device and supplemental supporting portions being connected together and so arranged with relation to the remainder of the machine that the channel will always be parallel to the direction of feed movement of the awl regardless of the position of the horn except during the cutting operation, when a movement of the said cutting device and support is produced with relation to the awl and driver to trim the end of the previously-driven peg.

A further feature of the invention consists in so constructing the feed-channel through the cutting device that the walls thereof in the middle, where there is no cutting edge, project toward the path of the awl, with such space between them as to permit the free movement of the awl when straight, but to engage the same if bent and bend it back to its normal condition, so that it cannot possibly come in contact with the cutting edge. Beyond the middle at each end the walls of the channel are separated to a greater extent and inclined toward the narrow portion, so that the awl, if bent, will engage the said inclined portion in the feed movement and be properly straightened.

While in some cases it is desirable that the cutting device should be oscillated in the horn to perform the cutting operations, it is of advantage to cause the said cutting device to make a complete rotation at each operation, cutting the peg and turning completely around until it reaches its original position, then stopping during the punching and peg-driving operations. By this construction the tendency of the material to be drawn away from the gage in the return movement of the cutting device is obviated, while the inner surface of the material against which the cutter bears is less likely to be damaged when the movement always takes place in the same direction.

The invention further relates to novel operating mechanism for the cutter whereby such rotary movement is obtained, the mechanism being so arranged that the cutter at each operation makes a complete rotary movement without possibility of stopping short or overthrowing.

Figures 9, 11:
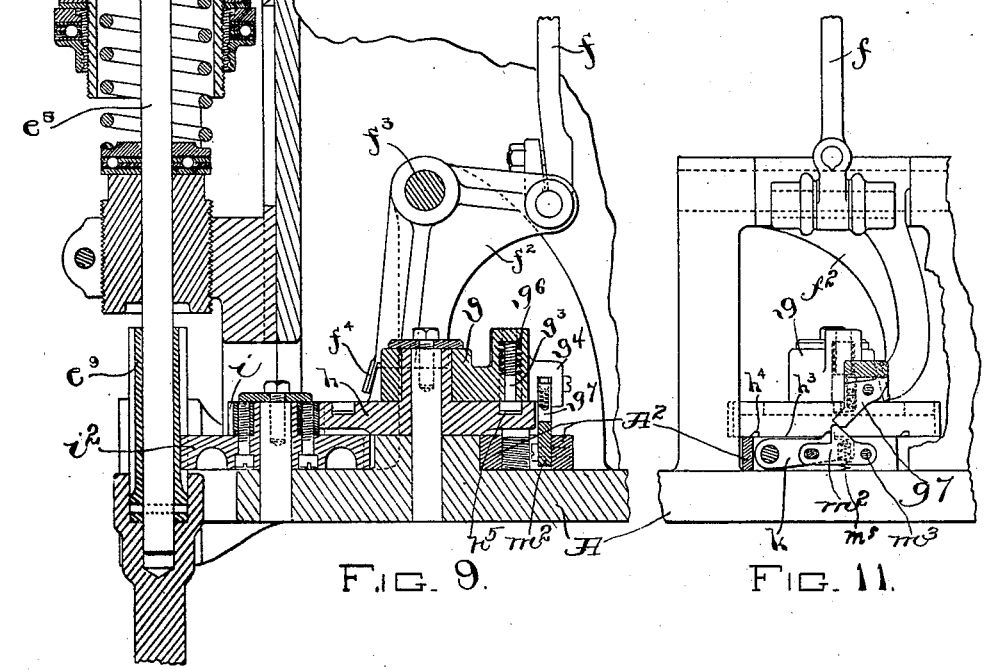
Figure 12:
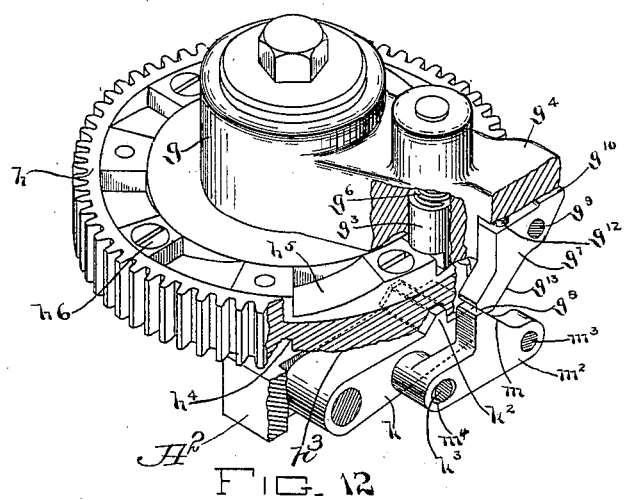
Figure 13:
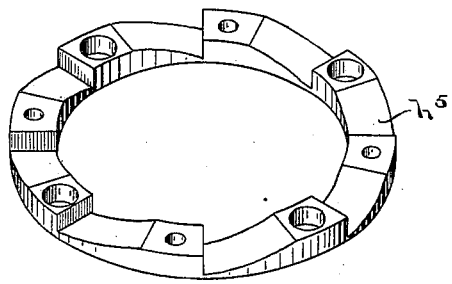
Figures 16, 17:
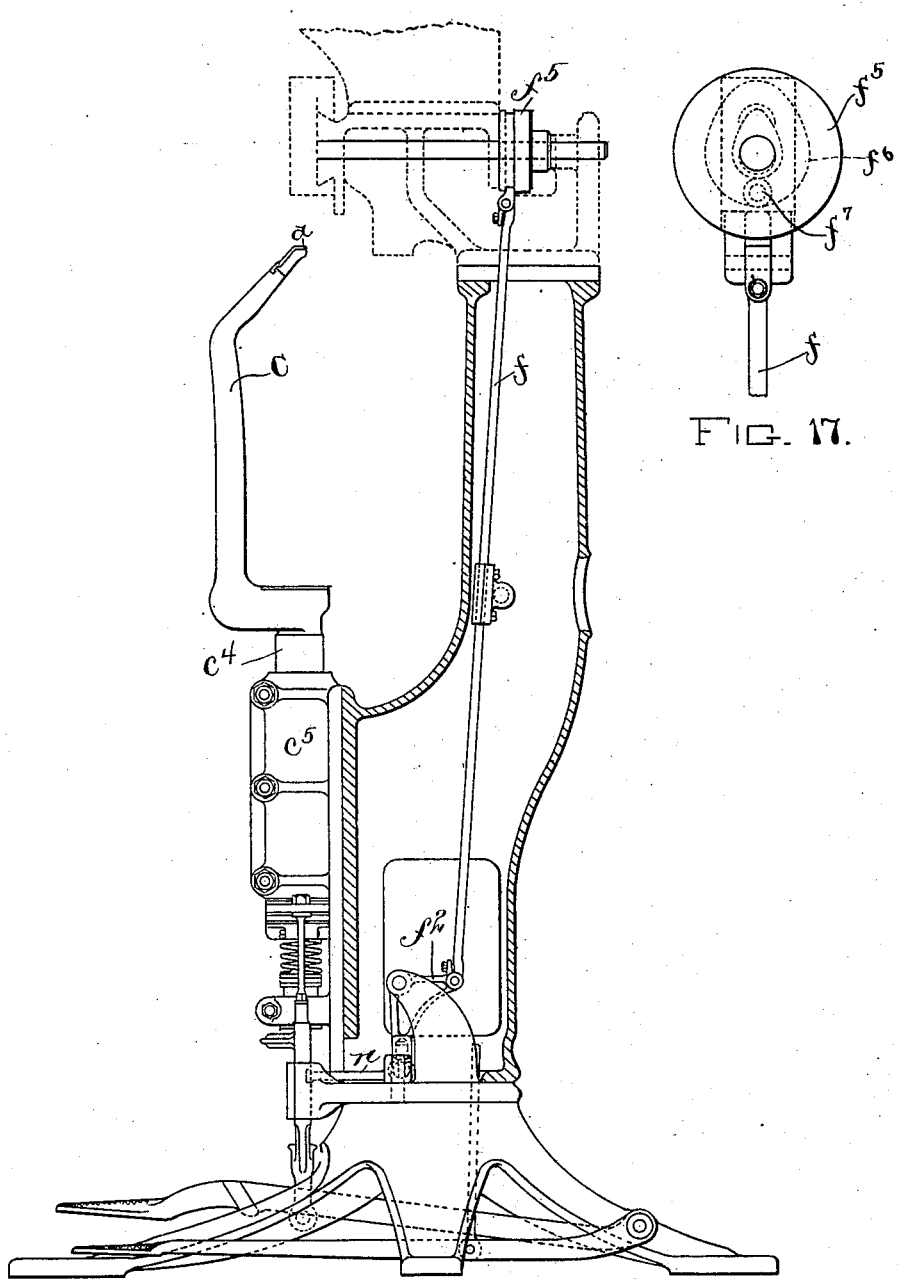

Figure 1 is a vertical section of the upper portion of the horn of a machine constructed in accordance with the invention, the top of the horn being shown in elevation. Fig. 2 is an enlarged plan view of the top of the horn; Fig. 3, a vertical section of the top of the horn on the same scale as Fig. 2; Fig. 4, a detail in perspective, showing the cover for the end of the horn; Figs. 5, 6, and 7, details showing in perspective the several parts of the cutting device; Fig. 8, a similar view showing a modification of the cutting member; Fig. 9, a vertical section of the lower portion of the horn and the mechanism for operating the cutting device; Fig. 10, a horizontal section taken on a line near the bottom of Fig. 9; Fig. 11, a detail mainly in elevation looking toward the right of Fig. 9; Figs. 12 and 13, details in perspective of parts of the cutter-actuating mechanism; Figs. 14 and 15, vertical and horizontal sections, respectively, showing a modification of the cutter-actuating device; Fig. 16, a general view, mainly in vertical section, of the lower part of the machine, the modified form of cutter-actuating device being shown for convenience; Fig. 17, a detail on an enlarged scale, showing the means for connecting the cutter-actuating mechanism with the operating-shaft of the machine; and Figs. 18 to 22, details of a modified cutting device especially adapted for use with the modified cutter-actuating mechanism shown in Figs. 14 to 16.

The invention relates to that type of machine in which the awl descends and completely penetrates the material, so as to project below the under surface thereof, and then moves laterally to feed the material. After such lateral feed movement the awl rises and moves back, the peg then being presented and driven into the hole previously made by the awl. In this type of machine it is essential that there should be an opening in the work-support of sufficient size to permit the lateral feed movement of the awl, which after it has been forced through the material projects below the surface of said work-support. In order to provide such an opening and at the same time to support the work close to the point of impact of the awl and peg, the cutting mechanism in accordance with the present invention is so arranged as to afford part of the work-support, said cutting mechanism having an elongated channel of sufficient width to permit the lateral movement of the awl and means for retaining the said channel in line with the feed movement of the awl except during the cutting operation if, as is commonly the case, a rotatable horn is employed. As herein shown, the cutting device is provided with a cutting member $a$, having a cutting edge $a^2$ near one end thereof, the said member being so shaped as to also afford a supporting-surface for the material. The said cutting member is mounted on a carrier $b$, so arranged as to be capable of rotary movement in the upper end of the horn $c$, the said horn being shown as provided with an annular supporting-shoulder $c^2$, surrounded by a flange $c^3$, which fits the carrier $b$ when the latter is supported on the shoulder $c^2$. The carrier $b$ is provided with a central opening $b^2$, the diameter of which is slightly greater than the extent of feed movement of the awl, which passes down through said opening in the punching operation and then travels diametrically across the same from one side to the other. Since the opening has to be of such size as to accommodate this feed movement, it is obvious that if the work were merely supported upon the surface of the carrier around the said opening it would tend to bulge inward in the punching and driving operations. To afford an adequate support for the work, therefore, a portion of the cutting member $a$ is utilized, and in conjunction therewith a supplemental supporting member $a^3$ is also employed, the said supplemental supporting member being also mounted in the carrier $b$. As herein shown, the said cutting member and supporting member are arranged to fit, respectively, in recesses $b^3$ and $b^4$, formed along the upper surface of the member $b$, the said parts being held in position by means of a top or cover $d$, which is adapted to be secured to the end of the horn, and is provided with an annular supporting-surface overlying the parts $a$, $a^3$, and $b$ and also fitting over the flange $c^3$, so as to maintain all of the said parts in place. The said cover is shown in perspective in Fig. 4 and has a shank $d^2$, adapted to be fitted on and secured to the horn. The surfaces of the parts $a$ and $a^3$ project upward from the bodies thereof, the thickness of the upwardly-projecting portions being substantially equal to the thickness of the annular portion of the cover $d$, so that the said cover and the said parts together afford a substantially flat support for the material, as best shown in Fig. 3. The horn is offset at its upper end in order that it may be inserted in the shoe to be pegged, and to properly present the said shoe in all the necessary positions the horn is rotatable, being mounted on a shank $c^4$, rotatably supported in a horn-supporting sleeve $c^5$ at the front of the machine.

To trim the pegs, it is necessary that the cutting edge of the member $a$ should travel across the line of driving, and it is also essential that in the normal position of the said member $a$ and its coöperating supporting member $a^3$ they should be so related to the horn that the channel between them will be along the line of feed movement regardless of the position of said horn. To accomplish the cutting and also to insure the proper location of the cutting device, as stated, the said parts are arranged to be rotated or oscillated in the cutting operation and also to be prevented from rotation with relation to the awl and driver except when such rotation is required for the cutting operation. For this purpose the cutting device is arranged to be operated by means of a rotating or oscillating rod $e$, extending upward through the horn and provided at its end with gear-teeth $e^2$, intermeshing with gear-teeth $b^5$, formed on the under surface of the member $b$, Fig. 7. The said rod $e$ is connected by bevel-gears $e^3$ with a supplemental rod $e^4$, whereby the said rod may be operated properly above the bend in the horn, and the rod $e^4$ is provided at its lower end with the gear $e^5$, connected through an intermediate gear $e^6$ with a gear $e^7$ upon an operating-rod $e^8$, which projects upward through the shank $c^4$ of the horn. The gears $e^5$, $e^6$, and $e^7$ are located in an offset portion of the horn, which is so proportioned that the supporting end of the horn is directly above the axis of rotation thereof, as is necessary in order that the material may be properly presented to the peg-driving mechanism in the operation of the machine. These gears serve to maintain the proper position of the cutting device relative to the awl and peg driving mechanism, it being obvious that if the rod $e^8$ and its gear $e^7$ are stationary during the rotation of the horn the said rotation will produce, through said gears, a corresponding rotation of the cutting device with relation to the horn, which will keep the said cutting device always in the same position relative to the awl and peg driving mechanism in the top of the machine. In the same way if the rod $e^8$ is rotated or oscillated it will produce a corresponding rotation or oscillation of the cutting device from its normal position thus maintained, and thereby cut or trim the end of the peg which has been driven.

As best shown in Figs. 9 to 11, inclusive, the rod $e^8$ is arranged to have a complete rotation at each cutting operation. The rotary movement is imparted to the said rod by means of an elbow-lever $f^2$, pivoted at $f^3$ and connected at one end with a reciprocating rod $f$, the other end of said elbow-lever being provided with a segmental gear $f^4$, which, through intermediate gears, as will be described, connects with the rod $e^8$. The rod $f$ is reciprocated by means of a cam $f^5$, Fig. 17, on the main shaft of the machine, the said cam having a curved channel $f^6$ to receive a projection $f^7$, connected with the rod $f$. The said segmental gear $f^4$ is beveled and arranged to intermesh with a similar gear $g^2$ upon an oscillating member $g$, which has a bearing concentric with a gear $h$, which is arranged, as will be described, to be moved a certain distance in one direction in response to the forward or operating movement of the oscillating member $g$ and to be held stationary during the inoperative movement of said oscillating member. The parts are so arranged that each operative movement of said member $g$ produces a complete rotation of the rod $e^8$. As herein shown, the gear $h$ is arranged to be turned one-eighth of a rotation at each operation of the member $g$ and is connected through an intermediate reducing-gear (shown as the connected gear-wheels $i$ and $i^2$) with a gear $e^9$ upon said rod $e^8$. In order that the horn may be depressed, as is common in this type of machine, the gear $e^9$ is provided with elongated teeth, so that it can slide up and down with relation to the gear $i^2$ without getting out of mesh therewith.

The horn-depressing mechanism, adjusting devices, &c., which are incidentally shown in the drawings, need not be particularly described herein, since they form no part of the present invention.

In order to keep the cutting device always properly positioned with relation to the work, it is essential that the said device when completely rotated should make at each operation one complete rotation without fail, it being absolutely essential that the said device should neither overthrow nor fall short. To this end the gear $h$ is provided with a locking device adapted to stop and retain the said gear at the end of each operative movement thereof, the said locking device being shown as consisting of a pawl $k$, Fig. 12, pivotally supported with relation to the gear $h$ and arranged to be normally pressed toward an engaging surface $h^3$, provided at suitable intervals with engaging shoulders or notches $h^4$. The said gear $h$ is arranged to be acted upon by a pawl or plunger $g^3$, connected with the member $g$, which has a radial supporting-arm $g^4$ for the said pawl, which is spring-pressed toward a suitable ratchet-surface $h^5$, connected with or formed on the gear $h$. This ratchet-surface is shown in Figs. 12 and 13 as formed on a separate ring secured, as by screws $h^6$, to the face of the gear $h$. The arm $g^4$, which carries the pawl or plunger $g^3$, overlies the face of the gear, and the said plunger is spring-pressed downward by means of a spring $g^6$, so that in the rearward movement of the arm $g^4$ the said plunger will ride up the inclined side of one ratchet-tooth and drop behind the perpendicular side thereof, so that in the next forward or operative movement of the member $g$ the gear $h$ will be caused to rotate. To prevent the gear from continuing its movement after the member $g$ has stopped, the said gear $h$ is arranged to be positively locked on the proper position by means of the locking device $k$, which enters one of the notches $h^4$ as soon as the said notch comes in line with the tongue or projection $k^2$. To unlock the gear, the movement of the member $g$ is slightly greater than the feed movement of the gear $h$, so that when the said member $g$ moves back to its starting-point it will carry the plunger $g^3$ beyond the engaging surface of the next ratchet-tooth, so that it is capable of a slight forward movement before engaging said ratchet-tooth at the next operation. During such forward movement it is adapted to unlock the locking device $k$, so as to leave the gear $h$ free to travel forward. For this purpose the said member $g$ is provided with an engaging member $g^7$, having an inclined surface $g^8$, adapted to engage a portion of the locking device in such a manner as to disengage the projection $k^2$ from the notch $h^4$. As herein shown, the inclined surface $g^8$ engages a corresponding inclined surface $m$, formed on a rocker $m^2$, pivoted at $m^3$, and so connected with the locking device $k$ that the pivotal movement will move said device $k$ on its pivot until the projection $k^2$ passes out of the notch $h^4$. As herein shown, the member $m^2$ has an elongated slot $m^4$, into which projects a pin $k^3$ from the locking member $k$, so that the movement of the member $m^2$ will cause a corresponding movement of the member $k$ to unlock the gear $h$. The member $m^2$ and the member $k$ are shown as pivoted in a support $A^2$, mounted on the frame $A$ below the gear $h$, and both are normally held in the position shown in Fig. 11 by means of a spring $m^5$, which acts directly upon the member $m^2$.

In order to permit the rearward movement of the member $g^7$ without unlocking the gear, the said member is shown as pivoted at $g^9$ upon the arm $g^4$ and provided with a stop $g^{10}$, which locks it when in its operative position, and a spring $g^{12}$, which permits it to rock upon its pivot when engaged by the member $m^2$ as the said member $g^7$ moves to the rear. The inclined surface $g^{13}$ of the said member in such rearward movement engages a portion of the member $m^2$, riding over the same and yielding without producing any movement of said member $m^2$. In the position shown in Fig. 12 the parts are about to operate, and it will be seen that as the member $g$ moves forward the member $g^7$ will engage and move the member $m^2$ so as to throw the projection $k^2$ out of the notch $h^4$ before the pawl $g^3$ engages the ratchet-shoulder to produce the movement of the gear $h$. At the end of the movement of the member $g$ the gear $h$ will be engaged by the locking device, which drops into the next succeeding notch, thus stopping and locking the gear in the proper position. It is thus rendered impossible for the gear $h$ to overthrow, since the locking device positively determines the successive positions of said gear, so that by the end of each operation the cutting device is left in the proper position to admit of the next pegging operation.

While the complete rotation of the cutting device is in many cases desirable for reasons hereinbefore stated, this operation is in some types of machine impracticable—for example, in machines in which the awl and driver descend at the same time, so that the peg has to be trimmed while the awl is projecting through the material. In a machine of this class it is practicable to oscillate the cutting device, causing the same to move far enough in one direction to sever the peg and then to return in the opposite direction to its normal position prior to the feed movement. As shown in Figs. 14 and 15 and incidentally in Fig. 16, the elbow-lever $f^2$ is connected by a universal joint with another elbow-lever $n$, which is shown as having a vertical pivotal axis at $n^2$ and which is provided at one end with a segmental gear $n^3$, which meshes directly with the gear $e^9$ upon the rod $e^8$. The vertical reciprocating movement of the rod $f$ will produce an oscillating movement of the elbow-lever and a corresponding oscillation of the rod $e^8$, so that the cutting edge will travel back and forth across the driving-line to sever the projecting end of the peg.

As shown in Figs. 18, 19, 20, 21, and 22, the shape of the cutting device as a whole is somewhat modified in this construction, it being necessary to make the supplemental supporting part of the cutting device smaller, so that it will not come in contact with the awl during the oscillating movement of the cutting device as a whole. While therefore a larger space has to be afforded in the support to accommodate the several movements of the working parts than in the type of machine where the rotary cutting device may be employed, it is still practicable to support the work with a much smaller tip or support than has been heretofore employed, so that in either type of machine a material advantage is gained by the arrangement which embodies the present invention. Furthermore, the cutting edge of the cutting device is protected from injury by accidental contact with the awl, since the walls of the channel through which the awl must pass in the feed movement act as guides or deflectors to straighten the awl if bent, so that it cannot come in contact with the cutting edge either prior to or during the cutting operation.

As shown in Figs. 8 and 20, a saw-tooth edge $a^{20}$ may be substituted for the knife-edge, the movement of the cutting device and shape of the cutting portion being such that the saw-teeth will operate to advantage.

I claim—

1. In a pegging-machine, a combined work-support and cutting device rotatably mounted and having a slot extending diametrically across the same, the cutting edge at one side of said slot being substantially parallel to the path of feed movement of the work and adjacent to the supporting-surface; and means for moving said cutting device on its axis of rotation to cause the cutting edge to act on the peg.

2. In a pegging-machine, a combined work-support and cutting device having a slot extending diametrically across the same; a cutting edge at one side of said slot and adjacent to the supporting-surface; and means for producing a complete rotation of said cutting device between successive pegging operations.

3. In a pegging-machine having an awl-feed, the combination with a work-support provided with a slot, the middle portion of which is substantially equal in width to the diameter of the awl; and a cutting edge near one end of said slot, the slot at said end being wider than at the middle, as set forth.

4. In a pegging-machine, a combined work-support and cutting device having a slot extending diametrically across the same; a cutting edge at one side of said slot and adjacent to the supporting-surface; actuating mechanism for said cutting device adapted to cause a complete rotation of said cutting device; and means for locking such actuating mechanism at the end of each operation.

5. In a machine for pegging boots and shoes, the combination with the horn or work-support; of a peg trimming or cutting device working in the top of said horn and having a radial slot in line with the path of feed movement of the work and a cutting edge at the side of said slot parallel to the said path of movement; and means for operating said device to trim the pegs, as set forth.

6. In a peg-trimming device rotatably mounted and having a supporting-surface for the work and a slot extending diametrically across said surface, a cutting portion at the edge of said slot substantially parallel to the path of feed movement of the work; and means for moving the trimming device to cause said edge to travel past and sever the projecting end of the peg.

7. A horn or work-support; an annular member rotatably mounted therein and a cutting device secured to said annular member, said cutting device constituting a part of the support for the work and having a radial slot extending to said annular member, one edge of said slot constituting the cutting portion which lies between the center of the work-support and said annular member and cuts the peg when said device is moved on its axis.

8. In a pegging-machine having an awl-feed, a work-support provided with a radial slot through which the awl travels; a cutting edge substantially in line with said slot; and a rotatable carrier for said cutting edge to move the same across the line of feed movement after the peg is driven.

9. In a pegging-machine, a rotatable horn; a slot extending diametrically across the surface thereof; means for preventing the rotation of the horn from changing the position of said slot relative to the other parts of the machine; a cutting edge formed on one side of said slot; and means for moving the said cutting edge to sever the peg, as set forth.

10. In a pegging-machine, a work-support having a central opening; a cutting device working therein and having a cutting member and a supplemental supporting member separated from each other to afford a slot or opening extending radially from said central opening; and a carrier for said members rotatably mounted in the horn.

11. In a pegging-machine, a work-support; a cutting device working therein and having a cutting member and a supplemental supporting member separated from each other to afford a slot or opening between them; a carrier having recesses to receive said members; and a top or cover for the horn arranged to constitute a retaining device for said carrier and members.

12. In a pegging-machine, a work-support; a cutting device working therein and having a cutting member and a supplemental supporting member separated from each other to afford a slot or opening between them; a carrier having recesses to receive said members; a top or cover for the horn arranged to constitute a retaining device for said carrier and members; and means for imparting a rotary movement to said carrier.

13. In a pegging-machine a rotary cutter having a radial channel normally in line with the feed movement of the awl and a cutting edge along said channel; and means for rotating said cutter comprising an actuator adapted to move said cutter a predetermined distance at each operation; and means for locking said cutter at the end of such movement.

14. In a pegging-machine a rotary cutter having a radial channel normally in line with the feed movement of the awl and a cutting edge along said channel; means for rotating said cutter comprising an actuator adapted to move said cutter a predetermined distance at each operation; means for locking said cutter at the end of such movement; and means for unlocking said cutter prior to the next movement.

15. In a pegging-machine, the combination with a rotary cutter; of a pawl for actuating the same; a locking device for arresting said cutter; and means for unlocking said device in response to the next actuating movement of said pawl.

In testimony whereof I have signed my name to this specification in the presence of two subscribing witnesses.

JOHN F. DAVEY.

Witnesses:
 Jos. P. Livermore,
 Jas. J. Maloney.